US011948596B2

United States Patent
John et al.

(10) Patent No.: US 11,948,596 B2
(45) Date of Patent: Apr. 2, 2024

(54) METHOD AND APPARATUS FOR DEFENDING AGAINST LASER OR OTHER ELECTROMAGNETIC WAVE-BASED AUDIO INJECTION ATTACKS ON VOICE-CONTROLLABLE DEVICES AND SYSTEMS

(71) Applicant: Board of Regents, The University of Texas System, Austin, TX (US)

(72) Inventors: Eugene Britto John, San Antonio, TX (US); Ram Narayan Krishnan, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 375 days.

(21) Appl. No.: 17/199,081

(22) Filed: Mar. 11, 2021

(65) Prior Publication Data
US 2021/0335383 A1    Oct. 28, 2021

Related U.S. Application Data

(60) Provisional application No. 62/987,949, filed on Mar. 11, 2020.

(51) Int. Cl.
*G10L 25/51*    (2013.01)

(52) U.S. Cl.
CPC .................................. *G10L 25/51* (2013.01)

(58) Field of Classification Search
None
See application file for complete search history.

(56) References Cited

U.S. PATENT DOCUMENTS

| 2013/0129136 A1* | 5/2013 | Harney ................. H04R 19/04 381/355 |
| 2018/0220216 A1* | 8/2018 | Agashe ................. G02B 5/208 |

* cited by examiner

*Primary Examiner* — Hemant S Patel
(74) *Attorney, Agent, or Firm* — Smith, Gambrell & Russell, LLP

(57) ABSTRACT

Embodiments may provide techniques that protect voice-controllable devices and systems such that the microphone can be shielded from attacking modulated laser beams. Embodiments may provide a physical device that may include two or more layers of integrated material that sits on top of the microphones of the voice-controllable devices and/or systems. The device may act as a physical barrier against the injected malicious laser beams while allowing sound waves reach the microphone for normal operation. For example, in an embodiment, an apparatus may comprise a first layer including at least one opening and a second layer including at least one opening, wherein the at least one opening in the first layer and the at least one opening in the second layer are arranged so as to block the passage of light, but to allow the passage of sound.

15 Claims, 8 Drawing Sheets

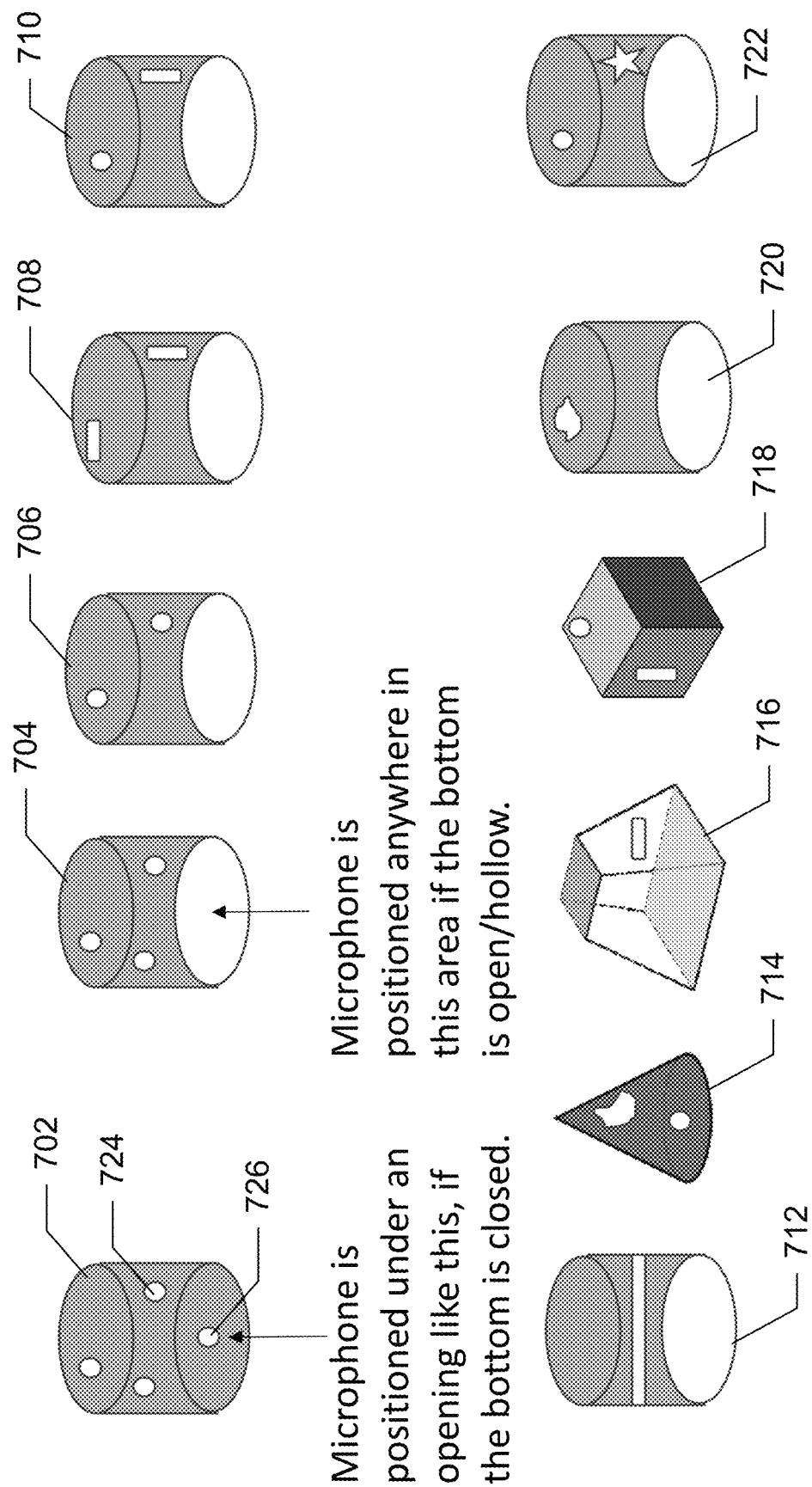

METHOD AND APPARATUS FOR DEFENDING AGAINST LASER OR OTHER ELECTROMAGNETIC WAVE-BASED AUDIO INJECTION ATTACKS ON VOICE-CONTROLLABLE DEVICES AND SYSTEMS

CROSS-REFERENCE TO RELATED APPLICATION

This application is a nonprovisional of and claims the benefit of U.S. Provisional Application No. 62/987,949, filed Mar. 11, 2021, the contents of which are incorporated herein in its entirety.

BACKGROUND

The present invention relates to techniques that protect voice-controllable systems such that the microphone can be shielded from attacking modulated laser beams. Embodiments may provide a physical device that may include two or more layers of integrated material that sits on top of the voice-controllable speakers.

Recently, researchers have shown that voice controllable systems such as AMAZON ECHO® and GOOGLE HOME® are vulnerable to laser-based audio injection attacks. The basic idea is that the laser can be modulated according to audio commands, which can then be directed toward a voice-controllable speaker as far as, for example, 110 meters away, sending inaudible and potentially invisible commands which are then acted upon by the voice controllable systems. Such attacks take advantage of the fact that that in addition to sound, microphones also react to modulated light aimed directly at them. Thus, by using an electrical signal which is proportional to an audio command to modulate the intensity of a light/laser beam, attackers can trick microphones into producing electrical signals as if they are receiving genuine audio command.

Accordingly, a need arises for techniques to protect voice-controllable devices and systems such that the microphone can be shielded from attacking modulated laser beams.

SUMMARY

The present invention relates to techniques that protect voice-controllable devices and systems such that the microphone can be shielded from attacking modulated laser beams. Embodiments may provide a physical barrier to prevent the passage of injected light, such as from a laser, that may be modulated to inject audio into a microphone. Such light may include, for example, visible light, ultraviolet light, infrared light, etc. The physical barrier may be of any shape with one or more openings/holes/slits (to let the sound waves pass through) of any shape such that those opening(s) are not in direct line of sight with the microphone from the light source.

Embodiments may include a physical device that may include two or more layers of integrated material that sits on top of the microphones of the voice-controllable devices and/or systems.

For example, in an embodiment, an apparatus may be configured to block the passage of light, but to allow the passage of sound. The apparatus may comprise at least one light-blocking portion configured to block the passage of light, and at least one opening configured to allow the passage of sound. The apparatus may be configured to be placed on a microphone and block the passage of light to the microphone, but allow the passage of sound to the microphone. The at least one light-blocking portion may comprise at least one layer of light-blocking material. The at least one light-blocking portion may comprise a plurality of layers of light-blocking material. Each of the plurality of layers of light-blocking material may include at least one opening and the at least one opening in each light-blocking layer and the at least one opening in another light-blocking layer may be arranged so as to block the passage of light to the microphone, but allow the passage of sound to the microphone.

The at least one light-blocking portion may comprise a body made of light-blocking material and at least one opening in the body, wherein the at least one opening in the body may be arranged so as to block the passage of light to the microphone, but allow the passage of sound to the microphone.

For example, in an embodiment, an apparatus may comprise a first light-blocking layer including at a light-blocking portion and least one opening, and a second light-blocking layer including a light-blocking portion and at least one opening, wherein the at least one opening in the first light-blocking layer and the at least one opening in the second light-blocking layer are arranged so as to block the passage of light, but to allow the passage of sound.

In embodiments, the apparatus may be configured to be placed on a microphone and block the passage of light to the microphone, but allow the passage of sound to the microphone. The apparatus may further comprise a spacer separating the first light-blocking layer from the second light-blocking layer. The first light-blocking layer may include one opening, the second light-blocking layer may include one opening, and the opening of the first light-blocking layer may be arranged opposite a portion of the second light-blocking layer not including the opening. The light-blocking portion of the first light-blocking layer may overlap with the light-blocking portion of the second light-blocking layer. The apparatus may comprise more than two layers and a light-blocking portion of at least one layer may overlap with a light-blocking portion of at least one other layer. The apparatus may be constructed from an opaque or light-blocking material.

BRIEF DESCRIPTION OF THE DRAWINGS

The details of the present invention, both as to its structure and operation, can best be understood by referring to the accompanying drawings, in which like reference numbers and designations refer to like elements.

FIG. 7 illustrates examples of light-blocking devices, according to embodiments of the present techniques.

DETAILED DESCRIPTION

Figure 1A:
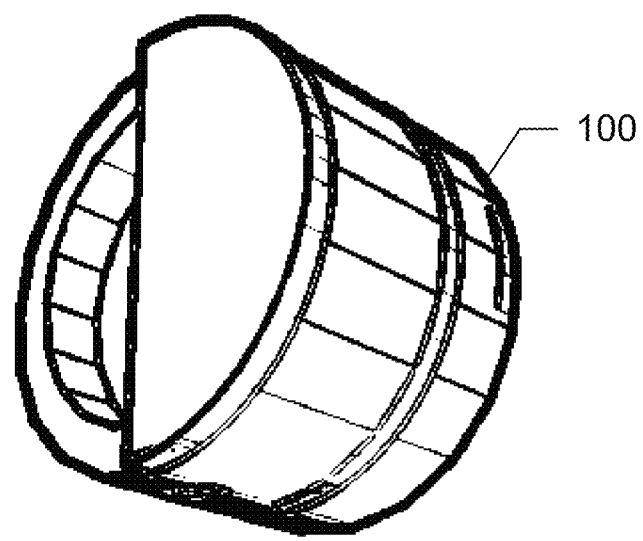
FIGS. 1a, 1b, 1c, and 1d illustrate a number of views of an example of a light-blocking device, according to embodiments of the present techniques.
Figure 1B:
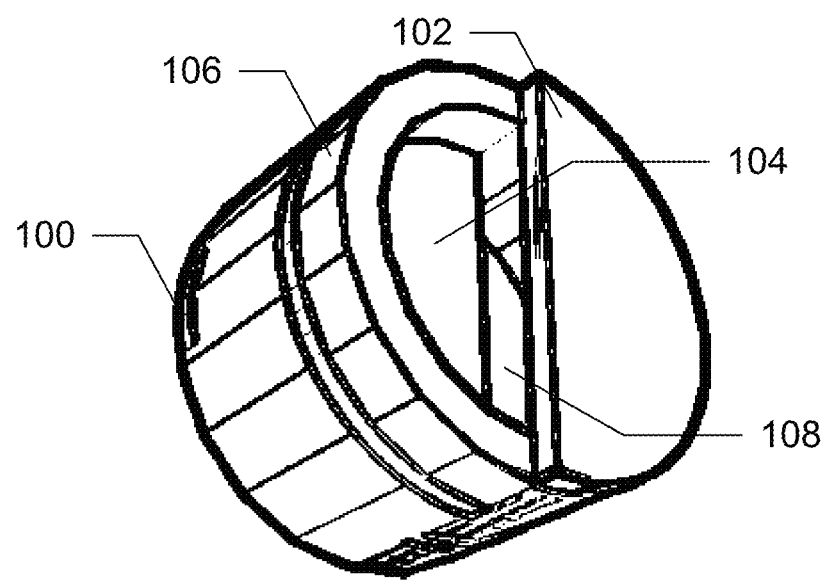
Figure 1C:
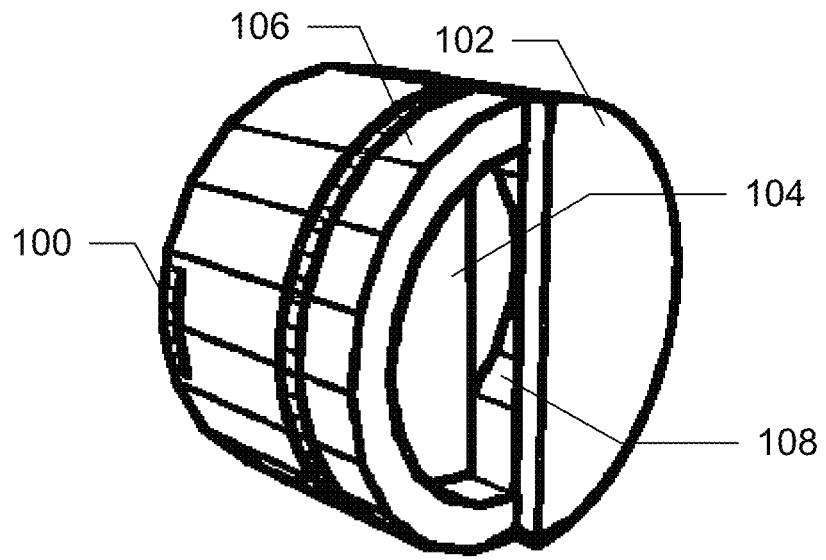
Figure 1D:
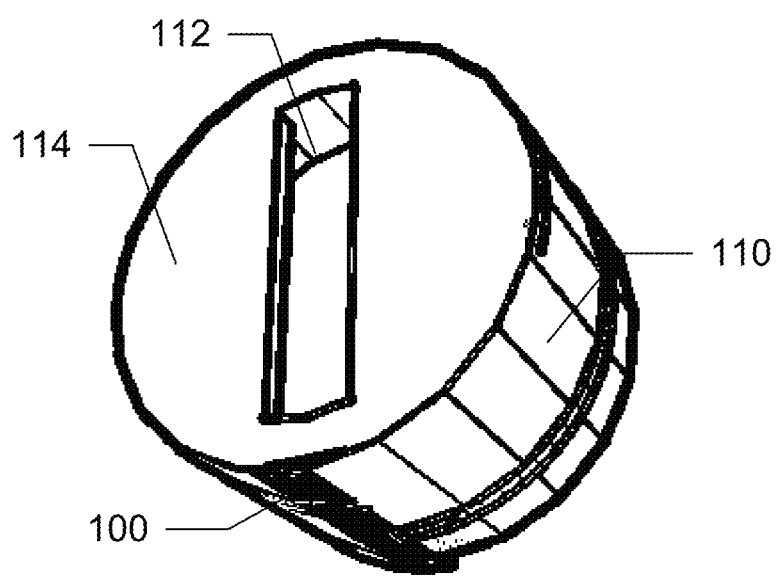

The present invention relates to techniques that protect voice-controllable devices and systems such that the microphone can be shielded from attacking modulated laser beams. Embodiments may provide a physical barrier to prevent the passage of injected light, such as from a laser, that may be modulated to inject audio into a microphone. Such light may include, for example, visible light, ultraviolet light, infrared light, etc. The physical barrier may be of any shape with one or more openings/holes/slits (to let the sound waves pass through) of any shape such that those opening(s) are not in direct line of sight with the microphone from the light source. The device may act as a physical barrier against the injected malicious light while allowing sound waves reach the microphone for normal operation Embodiments may include a physical device that may include one or multiple layers. It may be small, just to cover the microphone(s) or large, so that it covers the entire top part of devices, such as voice-controlled devices such as Alexa or Google Home. In the latter case it may just be a ring that will cover the microphone(s) with two or more layers of integrated material that sits on top of the microphones of the voice-controllable devices and/or systems Exemplary views of an embodiment of a device 100 are shown in FIGS. 1a-d. In this example, device 100 has at least three layers 102, 104 and bottom layer 114. Layers 102 and 104 are separated by a spacer 106 and are offset so that the opaque or light-blocking portion of each layer is located at the open portion of the other layer. This offset may provide the light-blocking capability of the device. In embodiments, the opaque or light-blocking portion of each layer may overlap with the opaque or light-blocking portion of at least one other layer to further provide the light-blocking capability of the device. Spacer 106 separates layers 102 and 104 to form an opening 108 between the layers through which sound waves may enter and reach the microphone. Further, as shown in FIG. 1d, device 100 may include an additional spacer 110 and an opening 112 in layer 114 to further allow the sound waves to reach the microphone.

Figure 2:
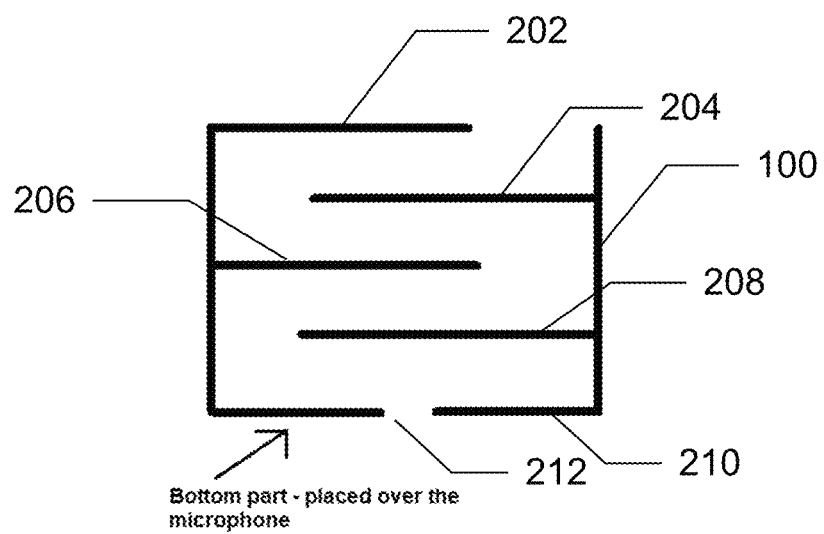
FIG. 2 is an exemplary illustration of a cross-section of an example of a light-blocking device, according to embodiments of the present techniques.

An exemplary cross-sectional view of an embodiment of a device 100 is shown in FIG. 2. In this example, device 100 may include four layers 202, 204, 206, and 208, in addition to bottom layer 210, which includes an opening 212 to be placed over the microphone. In this example, the opaque or light-blocking portion of each layer 202, 204, 206, and 208 may overlap with the opaque or light-blocking portion of at least one other layer to further provide the light-blocking capability of the device.

Figure 3:
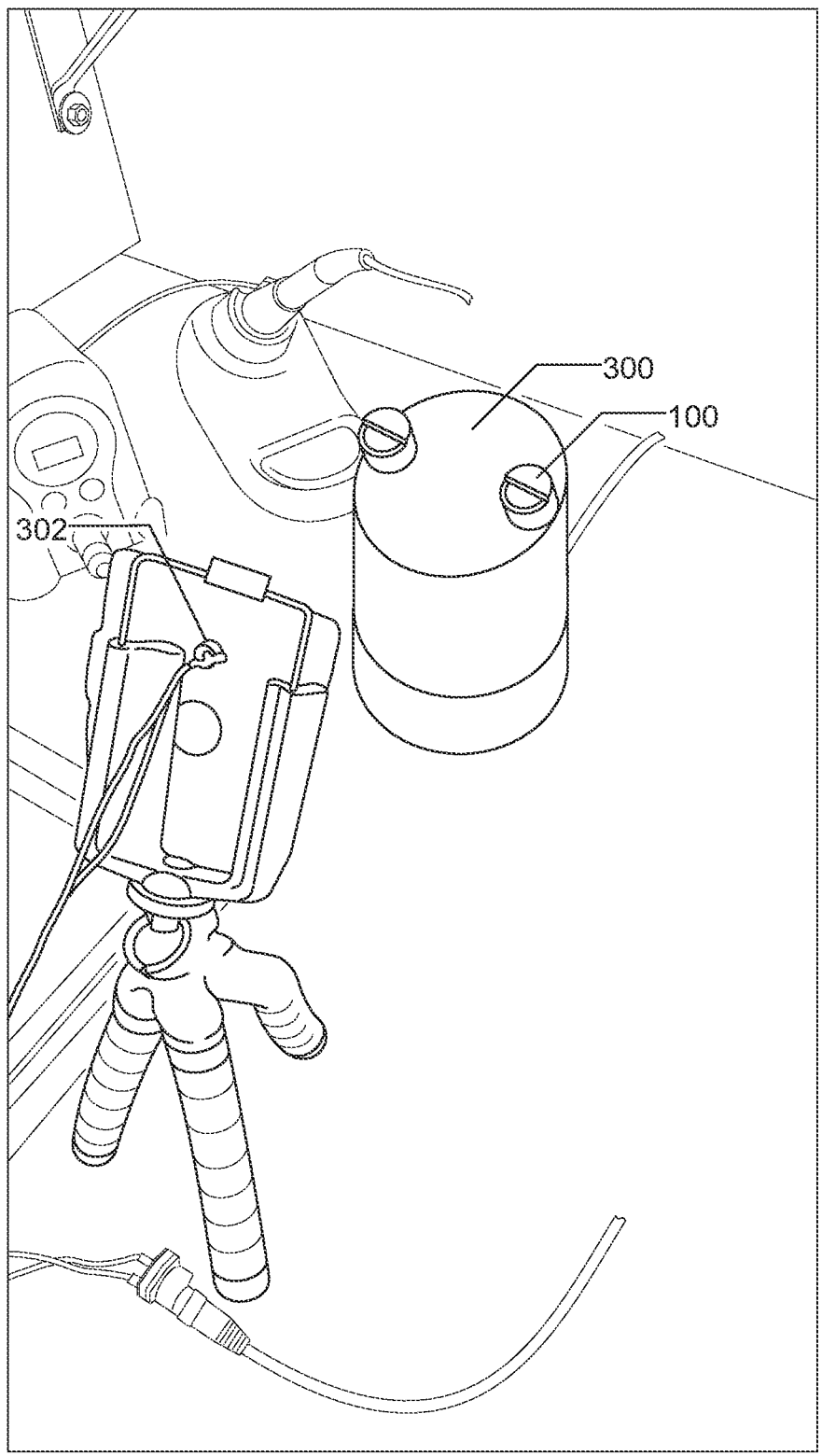
FIG. 3 is an exemplary illustration of operation of an example of a light-blocking device, according to embodiments of the present techniques.
Figure 4:
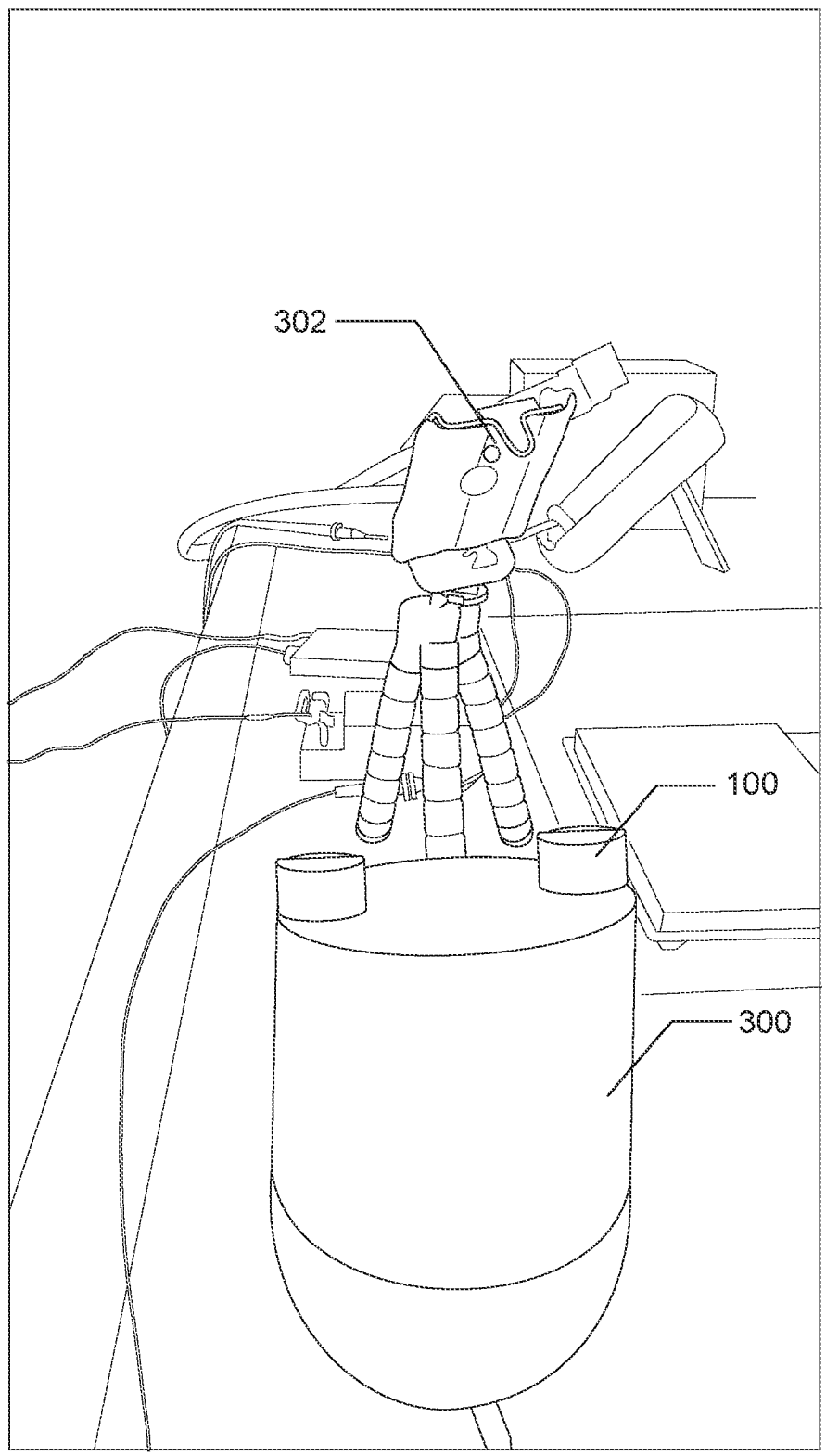
FIG. 4 is an exemplary illustration of operation of an example of a light-blocking device, according to embodiments of the present techniques.
Figure 5:
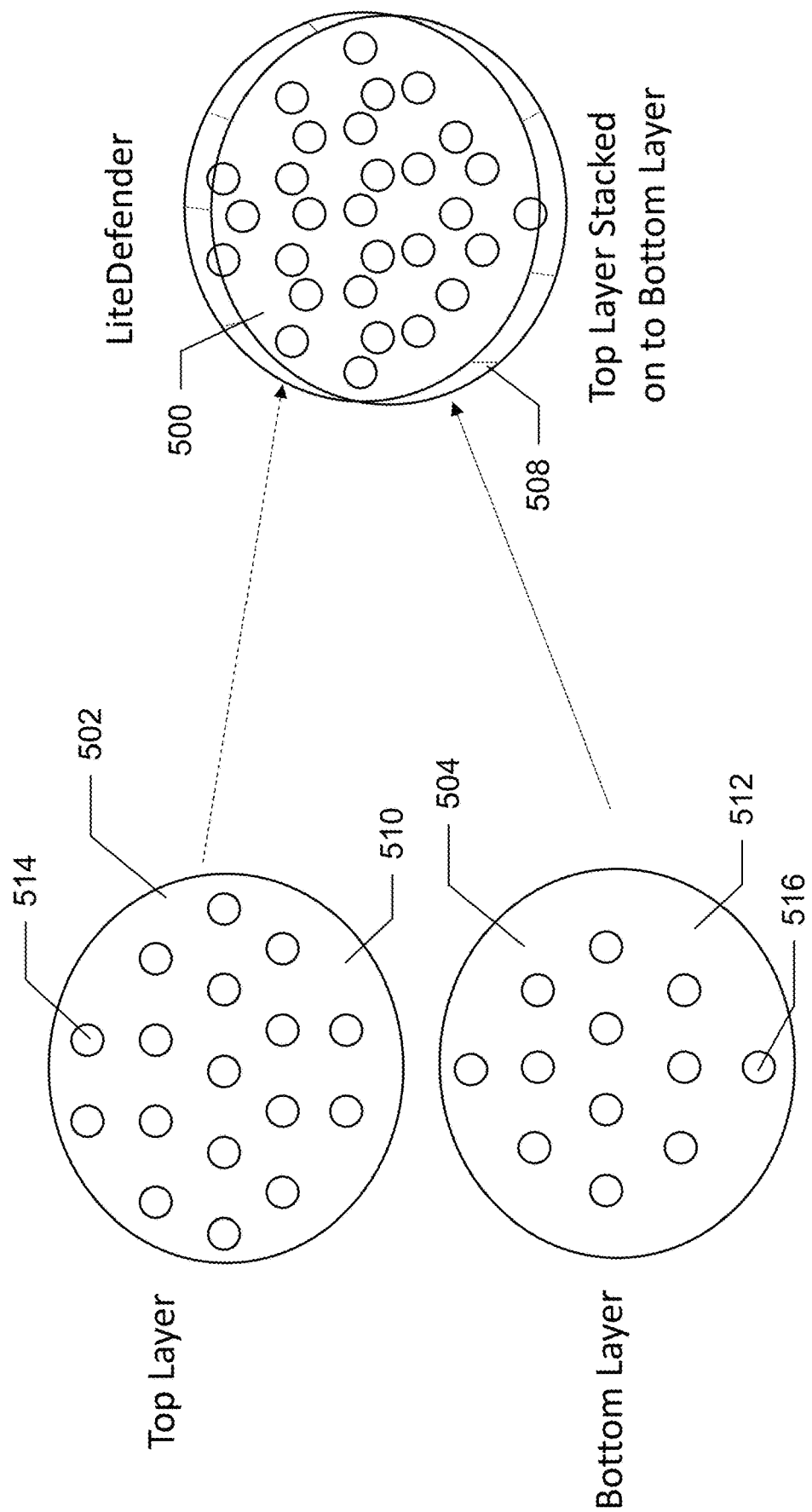
FIG. 5 illustrates an example of a light-blocking device, according to embodiments of the present techniques.

Examples of light-blocking device 100 in use are shown in FIGS. 3 and 4. As shown in FIG. 3, a light-blocking device 100 is placed over each microphone of a voice-controllable device 300. A laser 302 attempts to illuminate a microphone of voice-controllable device 300, but instead illuminates light-blocking device 100, which blocks the laser light from reaching the microphone, but allows sound waves to reach the microphone. Likewise, as shown in FIG. 4, light-blocking device 100, placed over each microphone of a voice-controllable device 300 is illuminated by laser light 302, but light-blocking device 100 blocks the laser light from reaching the microphone, but allows sound waves to reach the microphone.

An exemplary illustration of a light-blocking device 500 shows the device with two layers, a top layer 502 and a bottom layer 504. Each layer 502, 504 may include a surface 510, 512, which may be flat, concave, or convex, with physical holes 514, 516. The placement of holes 514, 516 may be opposite to one another across the two layers 502, 504. That is, wherever there is a physical hole 514 in the top layer 502, there is no hole in the bottom layer 504, and vice-versa. Further, layers 502, 504 may be separated 508 by spacing or by a spacer. Light-blocking device 500 may act as a physical barrier against malicious laser beams attempting to inject audio, while allowing sound waves to wrap around the holes and reach the microphone for normal operation.

Figure 6:
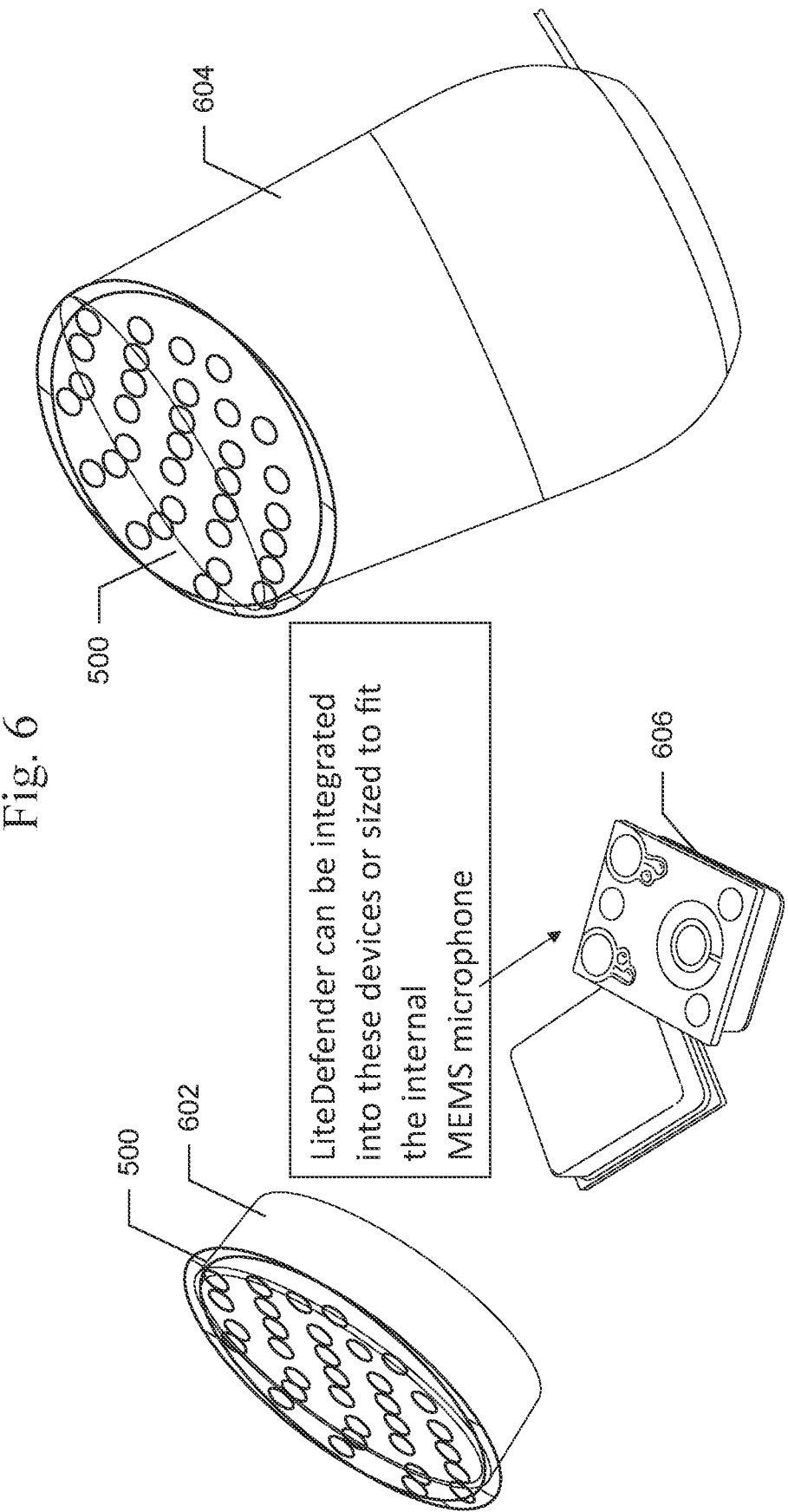
FIG. 6 is an exemplary illustration of use of an example of a light-blocking device, according to embodiments of the present techniques.

As shown in FIG. 6, Light-blocking device 500 may be used to protect, existing sound activated smart devices, such as smart speakers 602, 604, etc. Light-blocking device 500 (in appropriate size) may also be integrated on top of the microphone 606 during the manufacturing process including micro-fabrication and MEMS based fabrication.

Light-blocking devices 100, 500 may defend against laser-based audio injection attacks on any device or system that is controlled by a microphone. Therefore, the application of light-blocking devices 100, 500 may reach beyond voice-controllable speakers, such as AMAZON ECHO® and GOOGLE HOME®. Voice-controllable systems are finding their way into many scenarios including cars, smart home appliances, etc. Light-blocking devices 100, 500 may also be a highly effective solution in a military application context. Due to its simplicity, it can be used effectively even in unfriendly zones.

The physical barrier created by light-blocking devices 100, 500 can impact the listening capability of the microphone in the voice-controllable system. We do not anticipate this to be significant. This is a trade-off.

Exemplary configurations of the line of sight barrier with sample openings are shown in FIG. 7. In these examples, the light-blocking device may include a small hollow cylinder or other three-dimensional shape, for example, 0.5 cm diameter and 0.3 cm height, with the top part substantially covered and holes in for example, the side wall and/or in the top arranged so at to block the passage of light to a microphone, but allow the passage of sound to the microphone. As shown in the examples of FIG. 7, a body 724 may include one or more openings 726 to allow the passage of sound into the device and one or more openings to be positioned over a microphone, to allow the passage of sound to the microphone. In embodiments, the body 724 may have any shape, such as cylindrical 702, 704, 706, 708, 710, 712, 720, 722, conical 714, cubic 718, a truncated square pyramid 716, a conical or pyramidal frustrum (not shown), etc. In embodiments, the openings that allow sound into the device may be circular 702, 704, 706, 710, 714, 718, 722, rectangular or oblong 708, 710 712, 716, 718, or other regular or irregular shapes 714, 720, 722, and may be provided in any combination on each device. In embodiments, the openings that allow sound into the device may be arranged on the top of the device 702, 704, 706, 708, 710, 718, 720, 722, on the sides of the device 702, 704, 706, 708, 710, 712, 714, 716, 718, 722, or in any combination on both the top and sides of the device 702, 704, 706, 708, 710, 712, 718, 722. In embodiments, the bottom of the of the device may be closed 702 with one or more openings 726 to be positioned over one or more microphones. In embodiments, the bottom of the device may be open 704, 706, 708, 710, 712, 720, 722, in which case, the microphone may be positioned anywhere in the open bottom of the device.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus configured to block a line of sight passage of light to a microphone of a voice-controllable device, but to allow a passage of sound to the microphone, comprising:
a covering, for removably covering at least a sound inlet to the microphone of the voice-controllable device, wherein the covering comprises at least a first layer, a second layer, a third layer, and a gap, wherein the gap separates the first layer from the second layer and the second layer from the third layer, wherein the first layer has at least one opening for admission of a sound wave into the gap, wherein the third layer has at least one opening for exit of the sound wave from the gap to the microphone, wherein the gap and the second layer form a serpentine path for the sound wave from the opening in the first layer to the microphone while preventing the microphone and the opening in the first layer from being in line of sight with each other.

2. The apparatus of claim 1, further comprising:
at least one light-blocking portion configured to block the line of sight passage of light to the microphone, and
at least one opening configured to allow the passage of sound to the microphone.

3. The apparatus of claim 2, wherein:
the at least one light-blocking portion comprises at least one layer of a light-blocking material.

4. The apparatus of claim 2, wherein:
the at least one light-blocking portion comprises a plurality of layers of a light-blocking material.

5. The apparatus of claim 4, wherein:
each layer of the plurality of layers of the light-blocking material incudes at least one opening; and
wherein the at least one opening in a first layer of the plurality of light-blocking layers and the at least one opening in a second layer of the plurality of light-blocking layers are arranged so as to block the line of sight passage of light from the at least one opening in the first layer of the plurality of light-blocking layers to the microphone, but to allow the passage of sound to the microphone.

6. An apparatus for use with a microphone of a voice-controllable device, comprising:
a first light-blocking layer including at least a light-blocking portion and at least one opening;
a second light-blocking layer including at least a light-blocking portion;
a third light-blocking layer including at least a light-blocking portion and at least one opening; and
a gap separating the first light-blocking layer from the second light-blocking layer and also separating the second light-blocking layer from the third light-blocking layer;
wherein the at least one opening in the first light-blocking layer admits a sound wave into the gap, wherein the least one opening of the third light-blocking layer permits the sound wave to exit from the gap to the microphone, and wherein the gap and the second light-blocking layer are arranged to form a serpentine path for the sound wave travelling from the opening in the first light-blocking layer to the microphone and also so as to block a line of sight passage of light to the microphone from the opening in the first light-blocking layer when the apparatus is removably placed over the microphone.

7. The apparatus of claim 6, wherein the at least one opening of the third light-blocking layer is arranged so that the at least one opening of the first light-blocking layer and the microphone are not in line of sight of each other.

8. The apparatus of claim 6, wherein the apparatus comprises more than three layers and a light-blocking portion of at least one layer overlaps with a light-blocking portion of at least one other layer.

9. The apparatus of claim 6, wherein the first light-blocking layer includes a plurality of openings, the third light-blocking layer includes a plurality of openings, and each opening of the plurality of openings of the first light-blocking layer are arranged relative to each opening of the plurality of openings of the third light-blocking layer so that there is no line of sight passage between each opening of the plurality of openings of the first light-blocking layer and the microphone.

10. The apparatus of claim 6, wherein the apparatus is constructed from an opaque or light-blocking material.

11. An apparatus for preventing a light-based attack on a sound-controllable device comprising:
a covering for removably covering at least a sound inlet to a microphone of the sound-controllable device, wherein the covering comprises at least a first layer, a second layer, a third layer, and a gap, wherein the gap separates the first layer from the second layer and the second layer from the third layer, wherein the first layer has at least one opening for admission of a sound wave into the gap, wherein the third layer has at least one opening for exit of the sound wave from the gap to the microphone, wherein the gap and the second layer form a serpentine path for the sound wave from the opening in the first layer to the microphone while preventing the microphone and the opening in the first layer from being in line of sight with each other.

12. The apparatus of claim 11, wherein the first layer has a first plurality of openings and the second layer has a second plurality of openings, and the arrangement of the first layer relative to the second layer and to the microphone is such that no opening of the first plurality of openings forms a line-of-sight path with the microphone and with any opening of the second plurality of openings.

13. The apparatus of claim 11, wherein the first layer, the second layer, and the third layer all comprise a material opaque, or nearly opaque, to light in the infrared, visible, and ultraviolet wavelength ranges.

14. The apparatus of claim 11, wherein the second layer in the gap occludes most of the opening in the first layer and most of the opening in the third layer so that there is no line of sight path possible between the opening in the first layer and the opening in the third layer.

15. The apparatus of claim 11, wherein the covering is sized so as to be easily placed on or removed from the top of the sound controllable device.

* * * * *